United States Patent [19]

Cormier et al.

[11] 4,279,562
[45] Jul. 21, 1981

[54] BUCKET CONVEYOR

[76] Inventors: Edward J. Cormier; Wayne Copley, both of P.O. Box 44164, Columbus, Ohio 43204

[21] Appl. No.: 88,218

[22] Filed: Oct. 25, 1979

Related U.S. Application Data

[63] Continuation-in-part of Ser. No. 818,614, Jul. 25, 1979, abandoned.

[51] Int. Cl.³ .................... B65G 35/00; B65G 43/00
[52] U.S. Cl. ................................ 414/598; 198/704; 198/856; 414/674
[58] Field of Search ............... 414/595, 598, 674; 187/10, 12; 198/703, 704, 709, 710, 712, 713, 855, 856

[56] References Cited

U.S. PATENT DOCUMENTS

| | | | |
|---|---|---|---|
| 515,781 | 3/1894 | Melius | 198/704 |
| 973,543 | 10/1910 | Müller | 414/598 X |
| 1,956,650 | 5/1934 | Milner | 414/674 X |
| 2,588,458 | 3/1952 | Allphin et al. | 414/595 |
| 2,855,072 | 10/1958 | Drummond | 187/10 |
| 2,888,099 | 5/1959 | Hoffmann | 187/12 |
| 3,380,603 | 4/1968 | Collins | 414/598 |
| 3,749,202 | 7/1973 | Puls | 187/12 |
| 3,891,062 | 6/1975 | Geneste | 187/10 |
| 4,046,226 | 9/1977 | Flinchbaugh | 187/12 |

FOREIGN PATENT DOCUMENTS 118906  9/1944  Australia .................................. 414/598

Primary Examiner—James L. Rowland
Attorney, Agent, or Firm—Biebel, French & Nauman

[57] ABSTRACT

A bucket conveyor is provided with a frame having upwardly inclined spaced parallel guide rails which support the bucket for up and down movement along the inclined guide rails, a chain-and-sprocket bucket support and drive mechanism is disposed along each side of the conveyor frame with the bucket being secured to the chains for movement therewith so that when the bucket is brought to the upper most end portion it will rotate around the sprocket at that location and thus dump the contents of the bucket. An alternative embodiment utilizes a bucket with a hinged bottom which falls away as the bucket reaches the top of the conveyor.

3 Claims, 9 Drawing Figures

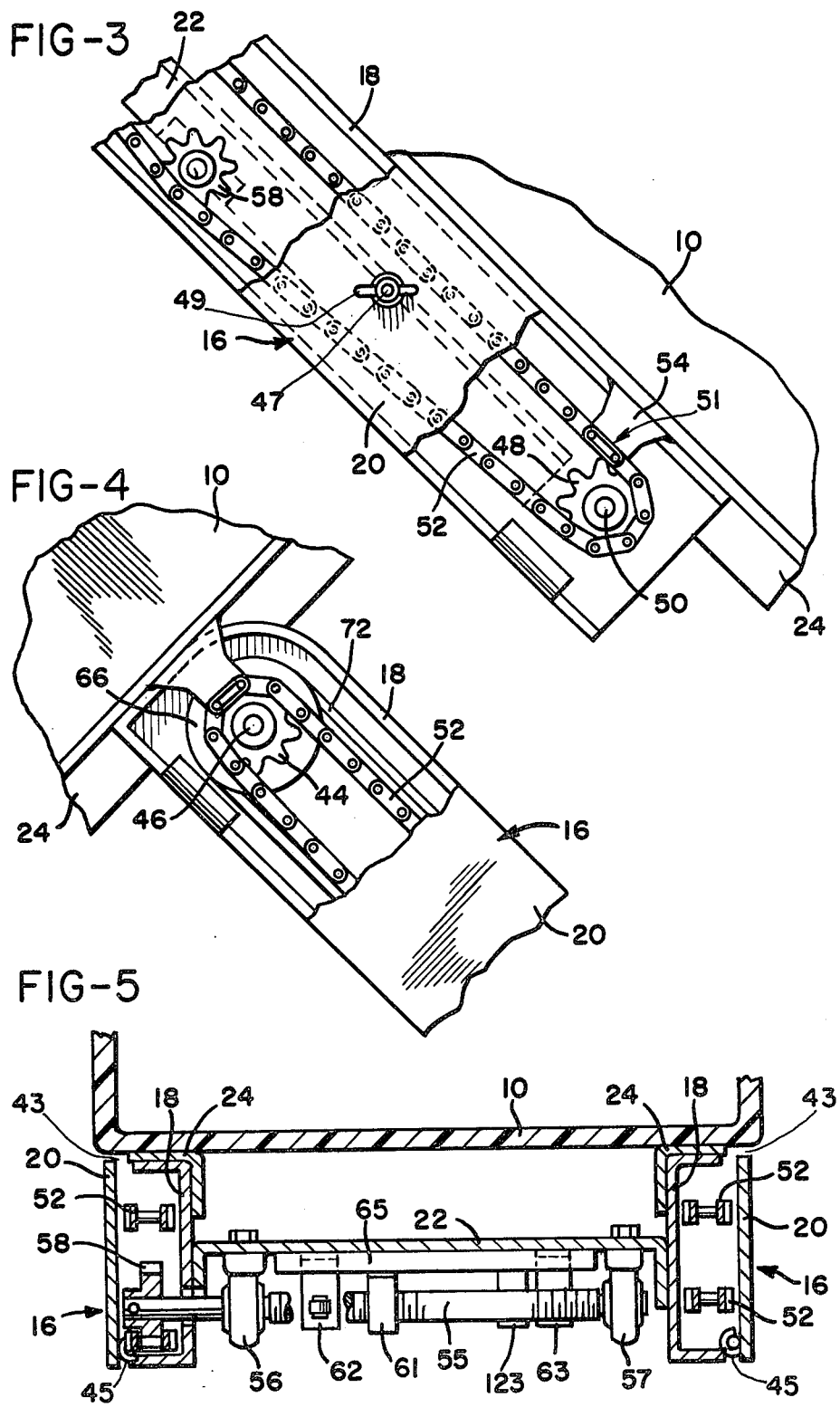

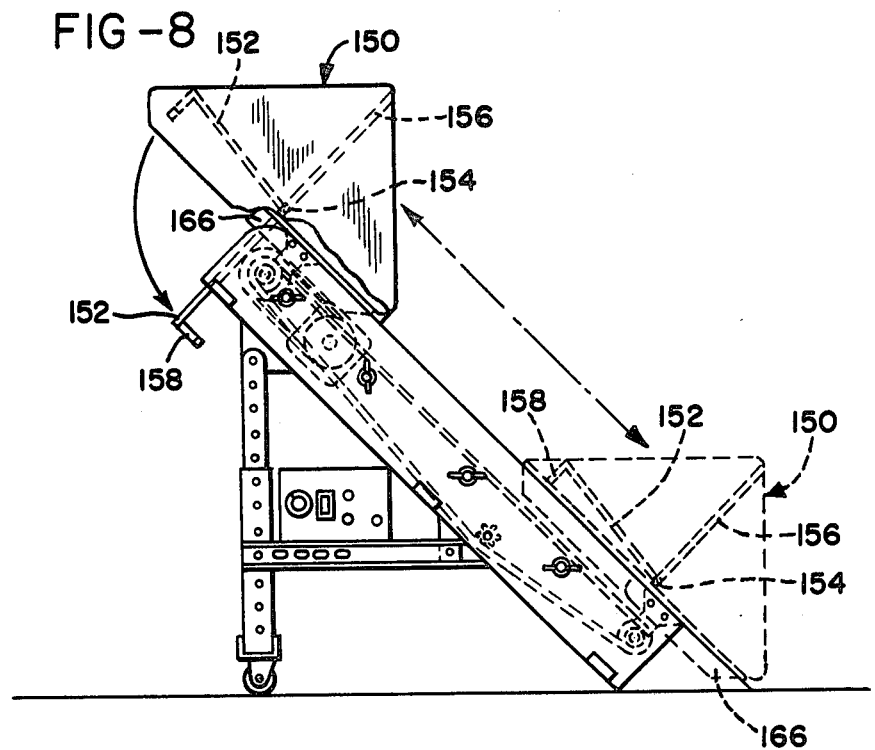
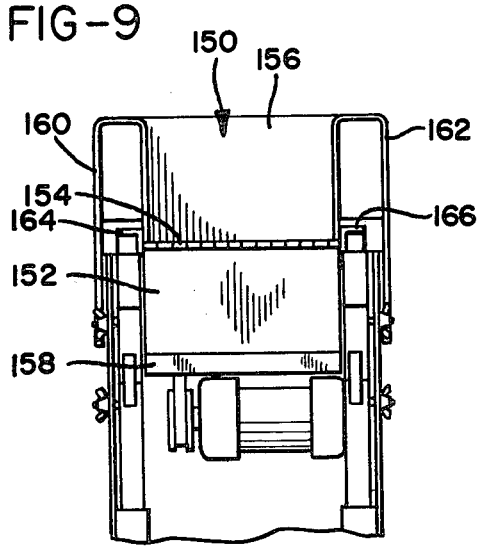

BUCKET CONVEYOR

RELATED APPLICATION

This application is a continuation-in-part of application Ser. No. 818,614, filed July 25, 1979, now abandoned.

BACKGROUND OF THE INVENTION

1. Field of the Invention

The present invention relates to conveyors and more particularly, to a single bucket type of conveyor which is moved up and down an inclined frame structure so as to pick up articles from a lower most position and deposit them at an upper position at the top of the inclined frame.

2. Prior Art

Many types of conveyors have been devised which utilize a bucket or similar form of container to move a payload up an inclined surface and then dump the payload in a desired receptacle. See for example, the following United States patents: Bollman U.S. Pat. No. 817,747, Snipes U.S. Pat. No. 930,321, Reubold U.S. Pat. No. 957,379, and Guy U.S. Pat. No. 2,401,150.

In addition, similar mechanisms have been utilized to provide inclined elevators for moving people and/or materials from one location to another elevated location from which they can egress or be removed. See for example, the following United States patents: Wood U.S. Pat. No. 1,933,131, and Allen U.S. Pat. No. 3,592,294.

All of the devices disclosed in the above referred to patents were designed for specific applications and have their special features which are directed to those specific applications. This is likewise true with the present invention.

In factories where large quantities of small parts are produced, it is common to use a continuously moving belt conveyor to convey such parts from one location to another for subsequent processing or packaging. However, such continuous conveyors are unnecessary in factories where plastic or metal parts are made in a molding operation in which a plurality of parts are formed in the mold at one time, the mold then being opened and the parts being dumped on a conveyor. The power consumption of such conveyors is substantial and in the case of molding operations where a plurality of the parts are deposited when a mold is opened and then a substantial time delay occurs until the next subsequent plurality of parts are dumped on to the conveyor, a substantial portion of the energy consumed is wasted.

In such operations it becomes advantageous to use a bucket conveyor in which the conveyor is only operated after the bucket has been filled. During the time in which the mold is forming the parts, the bucket is not operating and thus saves substantial energy over the continuous conveyor.

Continuously moving belt conveyors have other drawbacks as well, for example, the cost of replacing the large belts utilized in such conveyors is substantial, and since these belts are constantly moving and thus wearing, it is common to replace these belts quite frequently.

However, prior art bucket types of conveyors have different disadvantages from those associated with the continuous belt conveyors, particularly from a safety point of view. With continuous belt conveyors the workers are always aware of the continuous movement of the conveyor and are thus careful to avoid injury by contact with the moving parts. On the other hand, with the bucket type of conveyor, since it is only operated intermittently, it can surprise a worker when it is activated which may result in injury by contact with the bucket or other moving parts of the conveyor system. Further, with known prior art conveyors of the bucket type there is no provision for stopping the movement of the bucket should a worker become snagged on the bucket, or should parts become wedged between the bucket and its supporting structure. This can result in injury to the worker and possible catestrophic damage to the conveyor since it will continue to operate until something breaks or the obstruction is overcome.

SUMMARY OF THE INVENTION

The present invention overcomes many of the disadvantages and difficulties associated with the prior art devices of both the continuous conveyor and intermittent movement bucket conveyor devices disclosed above. This is accomplished by the provision of an intermittently operated bucket conveyor having a frame structure with an upwardly inclined guide means; bucket means movable along the guide means between a lower position wherein articles can be deposited in the bucket, and an upper position wherein articles will be dumped from the bucket; bucket support means for movably supporting the bucket between the upper and lower positions; a reversible motor drivingly engaging the bucket support means to cause movement of the bucket between the upper and lower positions; clutch means connecting the motor to the bucket support means and operable to disengage the motor from driving movement of the bucket upon the bucket meeting a predetermined level of resistance force; means for activating the motor means so as to cause the bucket to move from the lower position to the upper position; and means activated by the bucket support means and associated with the motor for causing the motor to reverse when the bucket is in the upper position so as to move the bucket from the upper position to the lower position.

The bucket support means is preferably an endless flexible member, such as a drive chain, extending from a bottom end portion to a top end portion of the guide means on the frame structure; a rotatable flexible member support means, such as a sprocket, disposed at each end portion of the guide means and drivingly supporting the flexible member for movement in an elongated path with annular end portions; and means securing the bucket to the endless flexible member for movement therewith. In one embodiment the securing means is operable for movement around the upper annular end portion of the path of movement of the flexible member so as to cause the bucket to rotate sufficiently to dump the articles therefrom.

The bucket support means is driven by the reversible motor through a clutch mechanism. The release tension on the clutch is adjusted to permit the clutch to disengage when the bucket or the bucket support means is inhibited in its movement by application of an opposing force such as would occur from foreign object becoming wedged between the bucket and the guide means.

The clutch mechanism prevents damage to various operating parts of the conveyor in the case of a foreign object stopping movement of the bucket and, in addition, provides a safety feature in that if a worker accidentally becomes entangled in the mechanism while it is operating, serious damage will not result since the release tension on the clutch can be adjusted to stop movement of the bucket before a large enough force to injure the worker is developed.

In an alternative embodiment of the present invention the bucket is not rotated when it is brought to the top of the inclined frame, but rather is provided with a hinged bottom which opens due to the effect of gravity and the weight of parts contained within the bucket.

BRIEF DESCRIPTION OF THE DRAWINGS

FIG. 3 is an enlarged, partially cut-away view of the lower end portion of the embodiment of FIG. 1 showing the chain and sprocket with the bucket attached thereto;

FIG. 4 is an enlarged partially cut-away view of the upper end portion of the embodiment of FIG. 1 showing a portion of the bucket in the dumping position;

FIG. 5 is a cross sectional view on line 5—5 of FIG. 1;

FIG. 8 is a side elevational view of a second, alternative embodiment of the present invention; and FIG. 9 is a rear elevational view of the upper portion of the embodiment of FIG. 8.

DETAILED DESCRIPTION OF THE PREFERRED EMBODIMENTS

Figure 1:
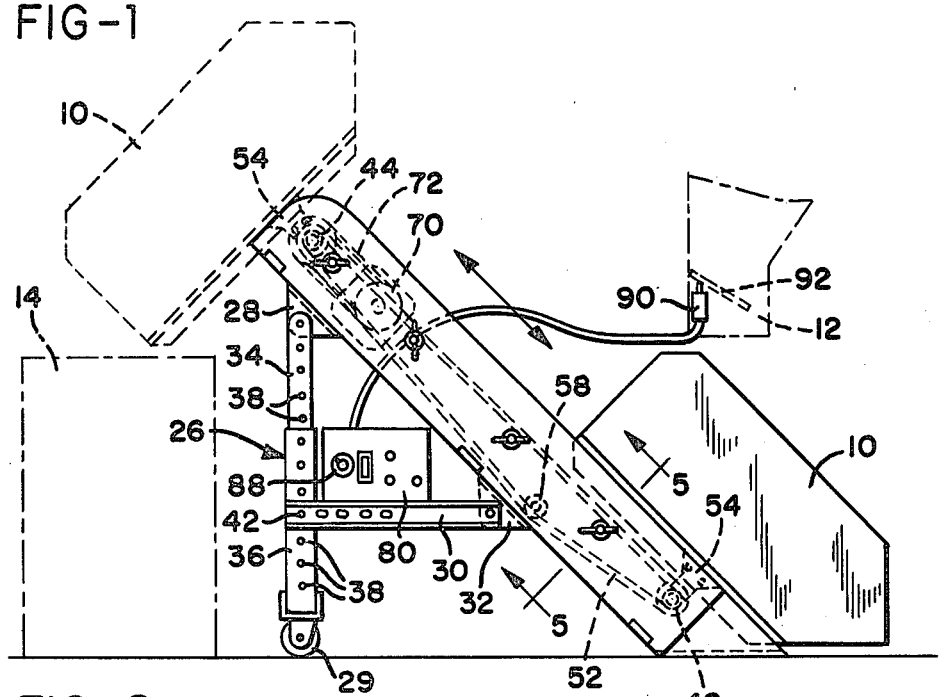
FIG. 1 is a side elevational view illustrating a first preferred embodiment of the present invention.

In FIG. 1 the bucket 10 is shown in the full line position at the bottom of the conveyor where it is loaded by an output trough 12 from, for example, a plastic part molding machine (not shown). The bucket 10 is shown in dotted lines in FIG. 1 at the upper most position on the conveyor where it dumps the parts received from the trough 12 into a container 14, or other place where the parts are to be deposited such as a sorting table or the like.

On each side of the conveyor is a housing 16 which, as seen in FIG. 5, is of generally rectangular cross section and formed by a U-shaped channel 18 and a flat closure plate 20. Housings 16 are held in spaced parallel relation by center plate 22 which extends from the top to the bottom of the conveyor and acts as a structurally supporting frame member to maintain the housings 16 in their proper spaced, parallel positions. Central plate 22 could of course be replaced by an open frame structure so long as it lends rigidity and structural integrity to the conveyor.

Again referring to FIG. 5, the bucket 10, which is shown as being formed of a plastic material, has a pair of right angled members 24 opening outwardly and secured to the bottom side thereof in proper spaced relation to ride on the upper facing outside corners of U-shaped channel members 18. Members 18 act as guide rails for movement of bucket 10 along the inclined conveyor.

Referring again to FIG. 1, a supporting frame structure is provided in order to permit the conveyor to be inclined at the proper angle to position the dumping location of the bucket at the proper height above the container 14 into which the parts are to be dumped. This frame structure comprises a pair of spaced vertical legs 26 (only one of which is shown) pivotally mounted at their upper end portions to brackets 28 (only one of which is shown) which are in turn bolted or otherwise secured to the lower surface of U-shaped channel members 18.

The bottom end portions of legs 26 are preferably provided with wheels 29 to permit the conveyor to be conveniently moved to a desired location. A pair of central, horizontal braces 30 (only one of which is shown) are secured each to one leg 26 at one end and have their opposite ends pivotally mounted to brackets 32 (only one of which is shown) which are bolted or otherwise secured to the respective bottom surfaces of U-shaped channel members 18.

Legs 26 are formed in two pieces 34 and 36 which matingly engage each other and are each provided with a plurality of holes 38 which can be aligned so as to permit the legs 26 to be lengthened or shortened and thus change the elevation of the dumping position of bucket 10. Horizontal braces 30 are likewise provided with a plurality of holes which can be aligned with the holes 38 in legs 26 also to permit adjustment of the height of the conveyor, since changing of the height of legs 26 also changes the distance from the legs to the brackets 32. The horizontal braces 30 and legs 26 are secured together by bolts 42.

Bucket 10 is moved up and down the inclined guide rails formed by the upper surfaces of U-shaped channel members 18 by a pair of spaced parallel sprocket-and-chain mechanisms one of each of which is disposed within each housing 16. An upper pair of sprockets 44 (one of which is shown in FIG. 4) are secured for rotation to a common drive shaft 46 and a lower pair of sprockets 48 (one of which is shown in FIG. 3) are likewise secured for rotation to a common shaft 50. Endless chains 52 are carried up upper and lower sprockets 44 and 48 upon each side of the conveyor and form an elongated path along the sides of the inclined conveyor with annular end portions where the chains extend around the sprockets 44 and 48.

Shaft 46 is mounted for rotation to housings 16 in such a manner as to be adjustably movable relative to shaft 50 that the distance between sprockets 44 and 48 can be adjusted to accommodate variations in chain lengths.

Bucket 10 is secured to the chains 52 by means of a pair of brackets 54 one of which is welded to each right angled member 24 and extends through the opening 43 defined in the housings 16 between the outer edge portion of U-shaped channel member 18 and closure plate 20. Closure plates 20 are pivotally supported by hinge members 45 secured to the lower edge portion of U-shaped channel members 18. Plates 20 are held in the closed position as shown, by bolts 47 each having a shoulder against which the plate 20 rests and the plates are held in this position by wing nuts as shown in FIG. 3.

Figure 7:
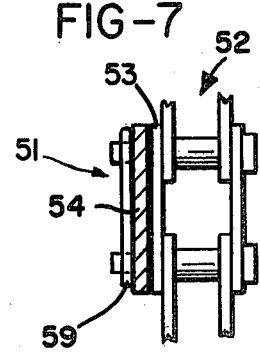
FIG. 7 is an enlarged view of the master link for the chain drive.

The lower end portions of brackets 54 are provided with holes which are spaced a distance equal to the pin spacing on a master link 51 of chain 52, as shown in FIG. 7. Master link 51 is provided with pins which are longer than is conventionally the case so that they will pass through the additional thickness of metal of brackets 54 in addition to conventional closure plate 53, all of which is held together with a U-shaped spring clip 59 in a conventional manner.

In order to indicate the position of the bucket 10 at either the upper or lower end portions of the inclined frame 16, a threaded rod 55 is mounted to the underside of central plate 22 in a pair of spaced bearing blocks 56 and 57. A sprocket 58 in engagement with one of the runs of chains 52 is secured to the end of rod 55 for rotation therewith. A threaded block 61 is mounted on the threaded rod 55 for movement therealong and is held from rotating by a guide member 65 extending along and parallel to rod 55. Located at each end of the path of movement of block 61 which corresponds to the distance the bucket must move from its position at the lower portion of the inclined frame to the upper portion of the inclined frame where the bucket is dumped are limit switches 62 and 63. These limit switches are contacted by the threaded block 61 as it progresses from one end portion of the threaded rod 55 to the other due to the rotation of the rod by engagement between the chain 52 and sprocket 58 as the bucket is moved up or down the incline.

Figure 2:
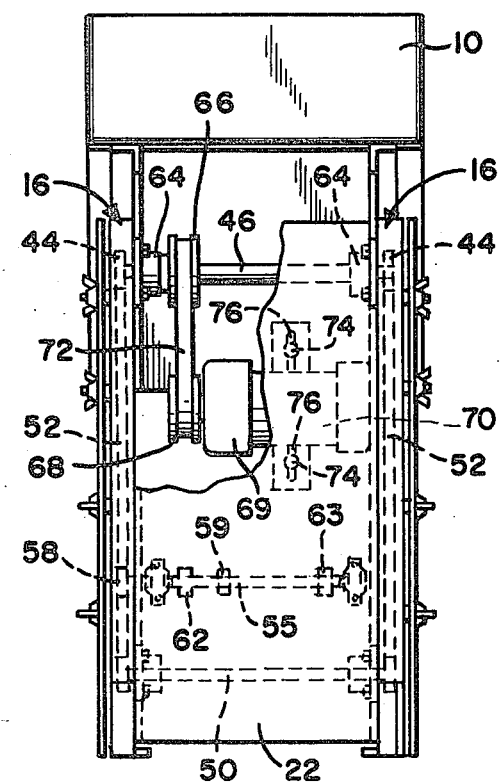
FIG. 2 is a front elevational view partially cut-away of the embodiment of FIG. 1.

Referring again to FIG. 2, the common drive shaft 46 which supports upper sprockets 44 is mounted in pillow block bearing members 64 which are secured to housings 16. Secured to drive shaft 46 for rotation therewith is a pulley 66. A further pulley 68 in alignment with pulley 66 is secured through a clutch or torque limiting mechanism 69 to a reversible drive motor 70 which is in turn adjustably secured to the underside of central plate 22. The torque limiting mechanism can for example, be of the type available from Morse Chain, division of Borg-Warner Crop. of Ithaca, New York and designated Model No. 250 A.

A belt, such as a timing belt having ribs on the driving surface thereof with corresponding indentations in the pulleys, is mounted on pulleys 66 and 68. Motor 70 is mounted on plate 22 via bolts 74 which extend through slots 76 in plate 22 to provide adjustment of the position of the motor in order to permit the adjustment of tension on belt 72. The clutch is adjustable to permit setting of the release tension on the clutch at a desired level. This adjustment is provided so that when the bucket 10 is met by an opposing force such as would occur if a worker accidentally had his arm caught between the bottom of the bucket and the top of center plate 22, the clutch 69 will release and thus prevent injury to the worker.

Figure 6:
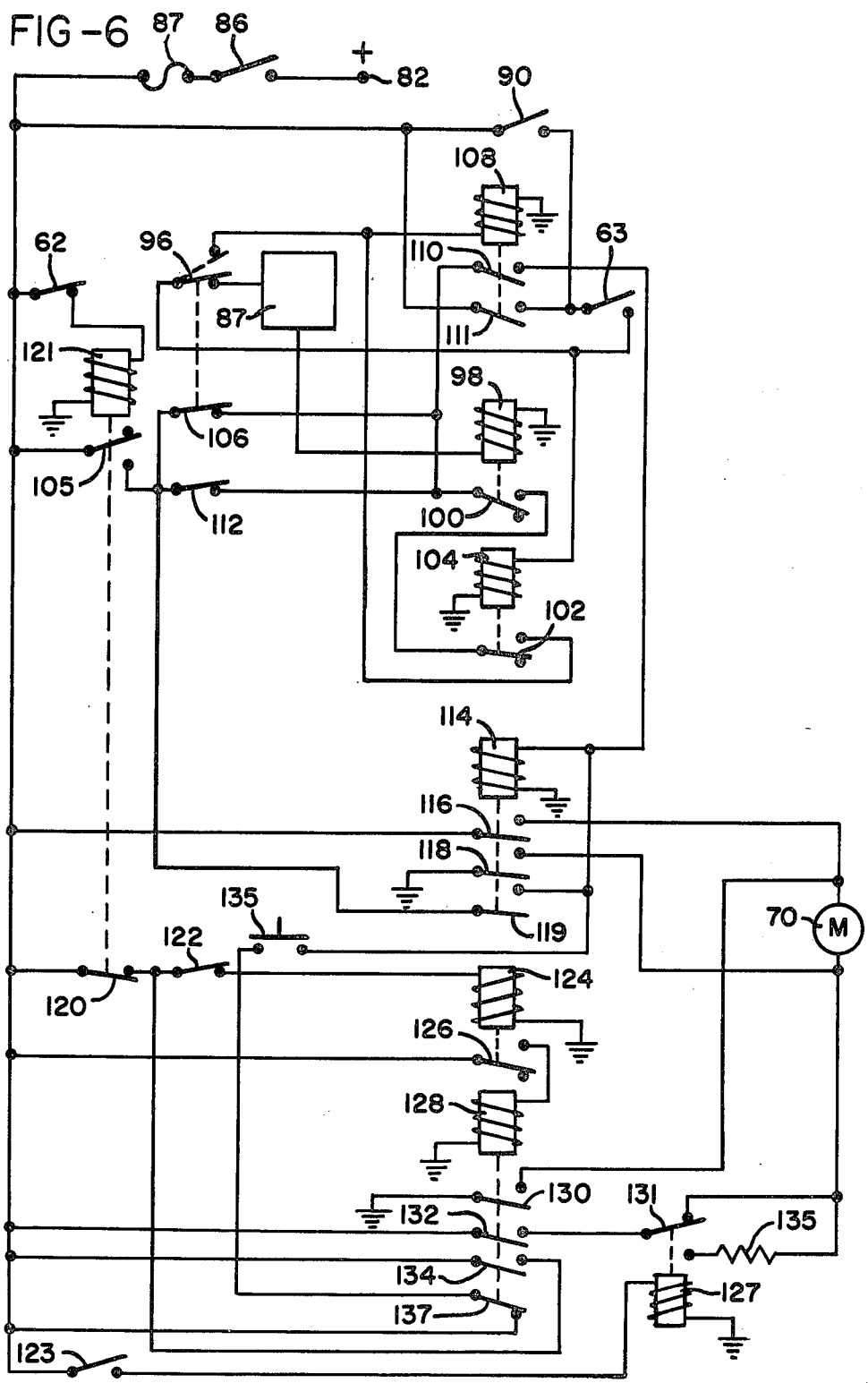
FIG. 6 is a schematic wiring diagram for the preferred embodiment.

In order to control operation of the conveyor of the present invention in coordination with depositing of articles in the bucket 10 from the trough 12 of the molding press, electronic circuitry is provided, the major components of which are contained within control unit housing 80. A schematic of the wiring circuit for the electronic control is illustrated in FIG. 6. Power input is applied through terminal 82 upon closing of the master power switch 86. A fuse 87 is also provided in case of a power overload or short circuit.

In order to permit the bucket 10 to be filled before the conveyor moves the bucket to its upper most position where its contents are dumped into the container 14, it is often desirable to allow the molding press to cycle several times and dump several batches of molded parts into the bucket before actuating the conveyor. In order to accomplish this a counting circuit is provided which actuates a mechanical or electrical counting member 87 that can be preset to any desired number of cycles of dial 88 (see FIG. 1).

Such a counter can be of conventional construction, for example, a model HZ170 counter, manufactured by G. W. Eagle Signal Industrial Controls Division of Gulf Western Manufacturing Company of Davenport, Iowa. This particular counter can then be adjusted to permit the molding equipment to cycle at any desired number of cycles between 2 and 100 times in order to fill the bucket 10 before the motor 70 is activated. However, many other counters are available which can give an extended range of cycles if this is desirable in a particular application.

A remote switch 90 is provided which is secured to the frame of the press adjacent the movable platen 92 in order to sense each time the platen opens and closes and thus activate the counter. Platen 92 is of conventional construction and forms part of the mold press.

Switch 90 is a microswitch which is so constructed as to operate the counter by movement of the platen 92 when the mold is being closed. This assures that all of the parts have dropped from the mold before the conveyor is activated. In the schematic wiring diagram of FIG. 6, switch 90 is in series with switch 63 which is also a microswitch that is moved to the closed position by the block 59 as described above when the bucket reaches its lower most position in order to activate the counter.

In series with switch 63 is switch 96 which is a manually controlled switch, such as a toggle switch, that can be moved between the closed, solid line position illustrated in FIG. 6, to the open, dotted line position illustrated. Switch 96 when in the solid line position permits operation of the counter as described below, but while in the dotted line position does not activate the counter, but permits the bucket to be moved up and down the conveyor each time the platen 92 closes as sensed by switch 90. Switch 96 thus permits manual selection of operation of the conveyor with or without the counter.

When switch 96 is in the solid line position illustrated in FIG. 6, i.e. so as to activate the counter, and switches 86 and 63 are closed, relay 98 will be activated once switch 90 has cycled the predetermined number of times as determined by the setting of the counter 87. Activation of relay 98 closes the contacts 100. When the bucket is in its lower most position relay 104 is continuously activated by switch 63 so as to close the contacts 102.

At the same time switch 96 is manually moved to the solid line position illustrated in FIG. 6, switch 106 is also closed. In fact, switches 96 and 106 can be incorporated into a double pole switch of conventional construction so that both are simultaneously opened or closed. When contacts 100 and 102 are closed relay 108 is activated to close and contacts 110 and latching contacts 111. Also, when the platen is closed switch 112 which is coupled to switch 90, is also closed. In this condition relay 114 is activated which closes contacts 116 and 118 in the motor circuit so as to activate the motor 70 to cause the bucket to move up the conveyor.

In addition to the switches 62 and 63 which are mounted adjacent to the threaded rod 55 in order to act as upper and lower limit switches on the movement of the bucket, a further microswitch 123 is positioned inboard of the switch 62 adjacent the rod 55, as shown in FIG. 5. Switch 123 as shown in FIG. 6, is mounted in the motor circuit and operates relay 127. Relay 127 in turn controls the switch 131 which is movable between a resistance bypass position as shown in position in FIG. 6, and an increased resistance position which is provided by the resistor 135.

During initial movement of the bucket upwards from its lowermost position switch 123 remains in the resistance bypass position so that the motor 70 will operate at full speed. After the bracket 59 moves along the threaded rod 55 to the point where it contacts the switch 123 the switch 131 will be moved to the resistance position and connected to the resistor 135 by activation of relay 129 so that the bucket again is slowed down due to additional resistance in the motor circuit. As the bucket reverses the position as described above, the reverse in the circuitry will occur so that the bucket will initially move relatively slowly from its upper most position until the bracket 59 contacts switch 123, at which point it will speed up.

Referring again to when the bucket reaches its upper most position, it closes switch 62 which activates relay 121 to close switch 120 and opens switch 105. With the exception of when the bucket is in its lower most position, switch 122 is closed and is coupled to switch 63 for movement therewith. Thus, with the bucket in its upper most position and switch 120 closed, time delay relay 124 will be activated which in turn closes contacts 126. Time delay relay 124 is of conventional construction and provides a time delay sufficient to permit the motor to stop, e.g. two to three seconds. At the end of the time delay the contacts 126 will be closed thus activating relay 128. Relay 128 in turn closes the contacts 130 and 132 in the motor circuit which reverses the direction of rotation of motor 70 thus causing the bucket to travel back down the conveyor.

Relay 128 also closes the contacts 134 which are latching contacts, so that although switch 120 is immediately opened as soon as the bucket starts down the conveyor, current will continue to pass to relay 124 and thus maintain the contacts 126 closed so as to operate relay 128. When the bucket again reaches its lower most position it activates switch 63 which again begins the counting cycle as described above.

The counter is so constructed that relays 98 and 104 remain activated until the bucket reaches the top. At that point, when switch 105 is opened, the counter resets itself to the predetermined number of cycles to be counted. Once the bucket reaches the lower most position and switch 63 is closed and since switch 106 remains closed as long as the counter is being used, relay 104 is again activated in order to maintain contacts 102 continuously closed during the counting cycle.

Activation of relay 108 closes contacts 110 which activates relay 114 which in turn closes the contacts 119 which can then provide power to relays 114 to operate the motor even if switch 112 is open. This permits operation of the reset switch 135 if the bucket is delayed in its cycle of movement for longer than necessary to be back in its lower most position before the mold opens. Also, contacts 137 are normally in a closed position except when the bucket is moving down the conveyor, i.e., when relay 128 is activated to close contacts 130 and 132 so that the motor 70 is reversed.

The circuit of FIG. 6 can be either AC or DC. The circuit is shown as a DC circuit and includes a DC motor. If it is desired to use an AC circuit it will be necessary to couple the motor differently, and how it is coupled will depend on whether an AC or DC motor is utilized.

Referring now to a second alternative embodiment as illustrated in FIGS. 7 and 8, rather than having the bucket rotate around the upper corner of the frame structure in order to dump the parts contained therein, the alternative embodiment uses a bucket 150 with a fallaway bottom 152. The bottom 152 is hinged by hinge 154 across its rear edge portion to the backing plate 156. Backing plate 156 is so positioned within the bucket 150 that when the bucket is positioned at the upper end portion of the inclined frame and the bottom 152 is open, it is in the same plane with the bottom 152 so that all of the parts will be dumped from the bucket. Bottom plate 152 is provided with a downwardly depending lip 158 which extends completely across the outer edge of bottom plate 152 and is engagable with the upper surface of plate 22 when the bucket 150 is ascending or descending along the inclined frame, in order to hold the bottom plate 152 in the closed position as illustrated in phantom in FIG. 8.

The side walls 160 and 162 are each formed of a double wall construction to lend stiffness to the bucket 150 and are each provided with an angle iron member 164 and 166, respectively, which are welded to the respective inner side walls below the hinge position 154, and are inclined so as to ride on the upper surface of housings 16 to support the bucket 150.

The bucket 150 is supported on the chain 52 in the same manner as the previously described embodiment, by utilizing a bracket 54 secured to the bottom of the bucket. Likewise, the same bucket position sensing mechanism described in connection with FIGS. 2 and 5 above is utilized to sense the position of the bucket at the top or bottom of the inclined frame by means of the limit switches 62 and 63, in order to effect proper activation of the motor, etc. Thus, in operation, the bucket 150 is moved essentially the same as bucket 10, except that when it approaches the upper end portion of the inclined frame structure it is stopped by activation of the limit switch 63, at a position where the bottom plate 152 is open to dump the parts, as shown in FIG. 8.

While the form of apparatus herein described constitutes the preferred embodiment of this invention, it is to be understood that the invention is not limited to this precise form of apparatus, and that changes may be made therein without departing from the scope of the invention as defined by the following claims.

What is claimed is:

1. An intermittently operable, portable bucket conveyor, comprising:
    a frame member having:
        a pair of spaced upwardly inclined guide rails;
        means securing said guide rails together in spaced parallel relation;
        a pair of vertically extending horizontally spaced legs pivotally secured at upper end portions of each thereof to respective upper edge portions of said inclined guide rails and having means for adjusting the height of said legs; and
        horizontally extending braces pivotally connected at one end portion of each to said inclined guide rails remote from said pivotal connection of said legs and having an opposite end portion of each secured to a respective one of said legs, said braces being adjustable lengthwise to accommodate height adjustment of said legs for inclining said inclined guide rails at a desired angle;
    a bucket capable of containing at least one article therein and movably supported on said guide rails for movement between a lower most position wherein at least one article can be deposited therein and an uppermost position wherein said at least one article will be dumped therefrom;

bucket moving means supported by said frame member and extending along said inclined guide rails for moving said bucket between said upper and lower positions, said moving means including:

at least one endless chain extending from a bottom end portion to a top end portion of said guide rails;

sprockets disposed at each said end portion of said guide rails and drivingly supporting said at least one endless chain for movement in an elongated path with annular end portions defined by movement of said chains around said sprockets, at least one of said sprockets being adjutably positionable towards and away from the other said sprocket; and means securing said bucket to said at least one endless chain for movement therewith, said securing means being operable for movement around a portion of said annular end portion of said path of movement at least at said top end portion of said guide rails so as to cause said bucket to dump said at least one article therefrom;

drive means engaging said one sprocket for causing rotation thereof;

clutch means intermediate said one sprocket and said drive means for disengaging said drive means upon application of a predetermined force to said bucket;

means for activating said drive means so as to cause said bucket to move from said lower position to said upper position; and means for causing said drive means to reverse when said bucket is in said upper position so as to move said bucket from said upper position to said lower position after it has dumped said at least one article.

2. An intermittently operable, portable bucket conveyor, comprising:

a frame member having;

a pair of spaced upwardly inclined guide rails;

a center plate extending substantially the length of said guide rails and securing said guide rails together in spaced parallel relation;

a pair of vertically extending horizontally spaced legs pivotally secured at upper end portions of each thereof to respective upper edge portions of said inclined guide rails and having means for adjusting the height of said legs; and horizontally extending braces pivotally connected at one end portion of each to said inclined guide rails remote from said pivotal connection of said legs and having an opposite end portion of each secured to a respective one of said legs, said braces being adjustable lengthwise to accommodate height adjustment of said legs for inclining said inclined guide rails at a desired angle;

a bucket having a hinged bottom plate which rides on said center plate, for containing at least one article therein and movably supported on said guide rails for movement between a lower most position wherein at least one article can be deposited therein and an uppermost position wherein said at least one article will be dumped therefrom by lowering of said bottom due to gravity as it extends beyond an upper end of said center plate;

bucket moving means supported by said frame member and extending along said inclined guide rails for moving said bucket between said upper and lower positions, said support means including:

at least one endless chain extending from a bottom end portion to a top end portion of said guide rails;

sprockets disposed at each said end portion of said guide rails and drivingly supporting said at least one endless chain for movement in an elongated path with annular end portions defined by movement of said chains around said sprockets, at least one of said sprockets being adjustably positionable towards and away from the other said sprockets; and means securing said bucket to said at least one endless chain for movement therewith;

drive means engaging said one sprocket for causing rotation thereof;

clutch means intermediate said one sprocket and said drive means for disengaging said drive means upon application of a predetermined force to said bucket;

means for activating said drive means so as to cause said bucket to move from said lower position to said upper position; and means for causing said drive means to reverse when said bucket is in said upper position so as to move said bucket from said upper position to said lower position after it has dumped said at least one article.

3. A conveyor as defined in claim 1 or 2 including:

a threaded rod extending transversely of said guide rails;

means supporting said threaded rod between said guide rails for axial rotation;

a sprocket secured to an end portion of said rod for rotation therewith and in engagement with said at least one endless chain to be rotated thereby;

a threaded block on said rod and movable therealong upon rotation of said rod;

said switch means including switches at each end portion of said rod, one of said switches respectively engagable with said block when said bucket is at said upper or lower end portion of said guide rails, for activating said drive means.

* * * * *